July 5, 1966  W. J. SACKETT, SR  3,259,375
COMPOUNDING AND BLENDING APPARATUS
Filed June 23, 1964  2 Sheets-Sheet 1

INVENTOR
WALTER J. SACKETT, SR.
BY *Walter J. Finch*
ATTORNEY

WALTER J. SACKETT, SR.
INVENTOR

United States Patent Office 3,259,375
Patented July 5, 1966

3,259,375
COMPOUNDING AND BLENDING APPARATUS
Walter J. Sackett, Sr., 3700 Echodale Ave.,
Baltimore 6, Md.
Filed June 23, 1964, Ser. No. 377,340
5 Claims. (Cl. 259—180)

This invention relates generally to gravity type mixers, and more particularly it pertains to a batch compounding apparatus for delivering mixed products.

There are many products in commerce which comprise mixtures of ingredients in various proportions to order. Plant foods, including chemical fertilizers, for example, are made up of several chemicals and designated by numbers such as 5–10–5 indicating the constituent proportions.

To meet the demand for various formulas, it is desirable to compound the mix directly for the customer to order rather than attempting to stock a great variety of mixes.

Accordingly, it is an object of this invention to provide a batch compounding apparatus which receives and weighs the various constituents of a mix product, thoroughly combines them, and delivers the product ready for use in a simple efficient manner.

Another object of this invention is to provide a novel compounding and blending system which compounds a mix directly, thus eliminating the need for stocking a great variety of mixes.

The present practice in a steady flow compounding plant requires lofty elevating, screening, pulverizing, and blending means as well as expensive multi-story tower areas for housing the equipment.

On the other hand, batch plants at present require altogether too much handling of materials in process using the usual individual small capacity machines.

With co-ordinated, combined means of the present invention, simplified equipment is featured, expensive building enclosures are eliminated and handling of materials and product are reduced to a minimum.

Still another object of this invention is to provide to related manufacturing processes not described, the easy adaption of a compounding and blending plant to predetermined rate flow by simply automatically timing the actuation of the trap doors and operating the conveyer with a variable speed driving means thus to almost completely automate the operation.

Figure 1:
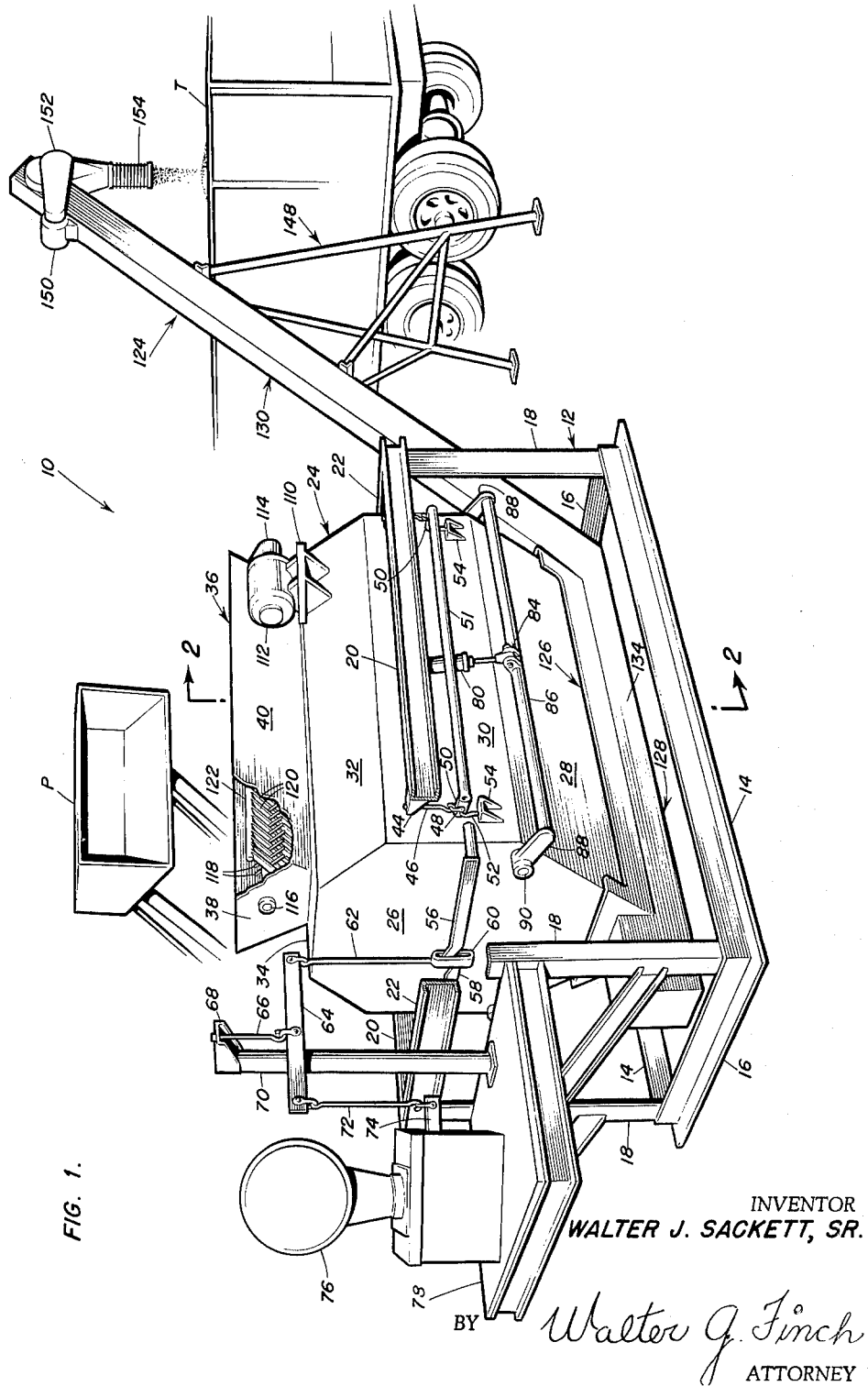
Figure 2:
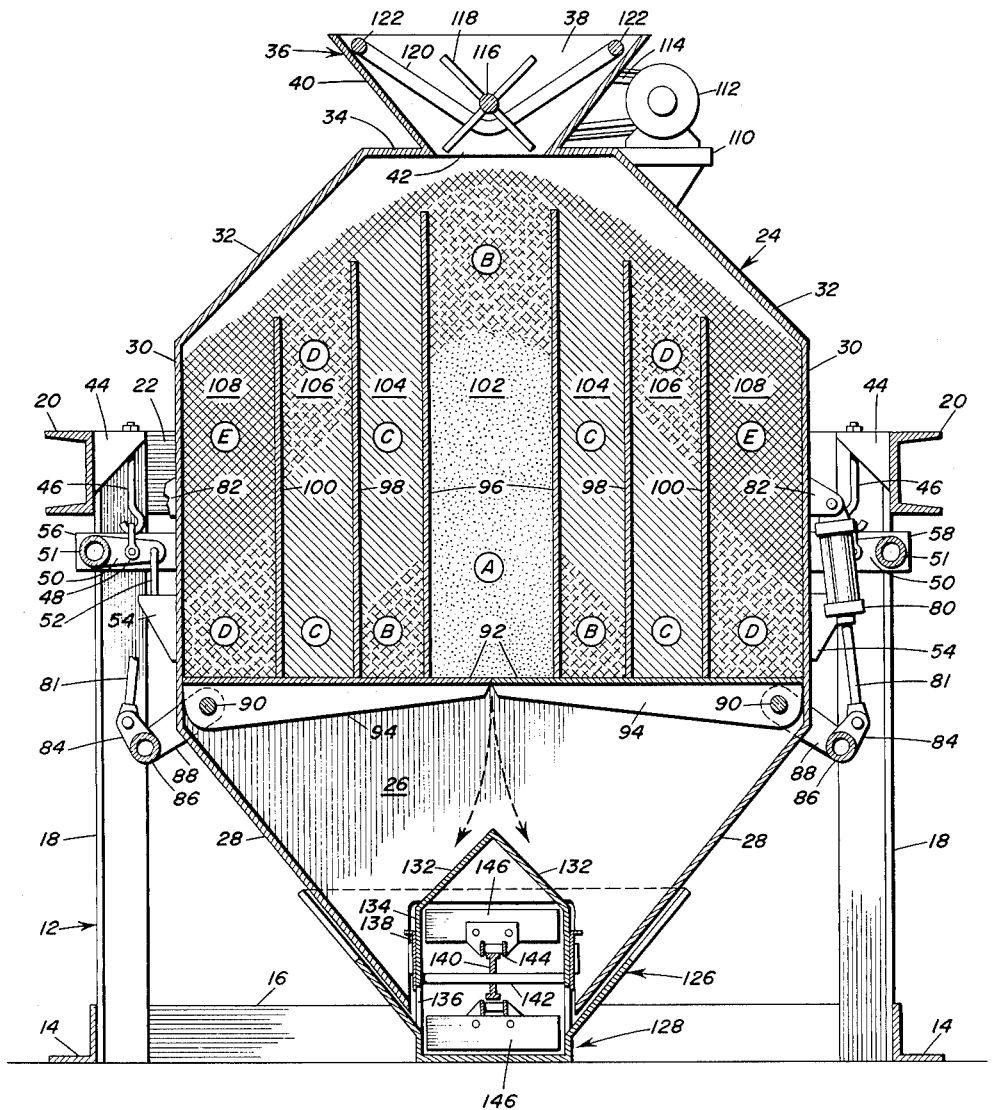

Other objects and advantages of this invention will become more readily apparent and understood from the following detailed specification and accompanying drawings in which:

FIG. 1 is a perspective view, partly broken away, of a compounding and blending apparatus incorporating features of this invention; and FIG. 2 is a vertical cross section taken on line 2—2 of FIG. 1.

Referring now to the details of the drawings, the compounding apparatus is designated generally by reference numeral 10. It is shown receiving constituents of a blend from a payloader bucket P and delivering the final mixed product to a spreader truck T.

The apparatus 10 consists of a supporting structure 12 comprising a rectangular framework of base members 14 and 16, vertical legs 18 and side and end channels 20 and 22 respectively.

A compartmented hopper designated generally by reference numeral 24 is suspended, as will be related, from the upper end channels 22 within this framework.

The hopper 24 is made up of a pair of generally hexagonal spaced end walls 26 to the edges of which are secured side vertical walls 30, lower slope sheets 28 and upper slope sheets 32 and a ceiling 34 to form a hollow structure.

The ceiling 34 is provided with a rectangular aperture 42 upon which is welded a receiving funnel 36. This funnel 36 is made up of two spaced end walls 38 and two oppositely sloping sidewalls 40 as best shown in FIG. 2.

A pair of spaced hanger brackets 44 are welded to each of the side channels 20 of the supporting framework and each has a depending hook or hanger rod 46. The hook ends of these hanger rods 46 each engage with a clevis 48 attached intermediate the ends of a short crank 50.

The inner ends of the cranks 50 are each apertured to receive hooked hanger bolts 52 and these bolts are secured to brackets 54 welded to the side walls 30 of the hopper 24.

The cranks 50 on each side of the hopper 24 are secured in spaced relation to a torque tube 51 and one end thereof protrudes beyond the end 26 of the hopper 24.

A lever 56 extending inwardly parallel to hopper end wall 26 is attached to the end of one torque tube 51. Another lever 58 similarly is attached to the other torque tube 51. A knife edge 60 receives the inner ends of these levers 56 and 58.

A rod 62 extends vertically from the knife edge 60 and is pivotally attached to one end of a lever 64. A clevis and hanger rod 66 support this lever 64 intermediate its ends from a bracket 68 fastened to the top of column 70.

The other end of the lever 64 is pivotally attached to a depending rod 72, the lower end of which is articulated to the scale actuating lever 74 of a dial scale 76. The column 70 and dial scale 76 are mounted on a platform 78 extending from the vertical legs 18 of the framework. It will be noted the dial of the scale 76 faces in a direction so as to be visible to the operator of the payloader bucket P.

A pair of hydraulic cylinders 80 (only one shown) are mounted on each side of the hopper 24 on brackets 82. The piston rods 81 each engage ears 84 welded intermediate the ends of tubes 86. The ends of the tubes 86 are secured to cranks 88 which rotate journaled shafts 90, extending inside the hopper 24 one at each side thereof.

Each shaft 90 carries a trap door 92 on stiffener ribs 94 and these doors 92 can thus be opened downwardly as shown by the arrows when the cylinders 80 are actuated.

In the closed position, the doors abut the lower edges of divider panels 96, 98, and 100, which are vertically secured in spaced relationship inside the hopper 24 to its end walls. These panels 96, 98, and 100 terminate at their upper edges short of the upper slope sheets and the ceiling 34, and thus form open top adjacent rectangular compartments 102, 104, 106 and 108 of descending height enumerating from the center outwardly to each side.

A motor 112 is mounted on a table 110 to the upper side of the hopper 24, and by drive means 114 is arranged to rotate a shaft 116 extending longitudinally through the receiving funnel 36. A plurality of stiff spokes 118 extend radially from the shaft 116 and rotate with it. The spokes 118 interleave with a plurality of stationary angular breaker rods 120 supported on rods 112 extending from end to end of the funnel 36, and are used to break up lumped constituents.

Reference numeral 124 indicates a conveyer apparatus generally as disclosed in my co-pending U.S. patent application Serial No. 309,532 filed September 17, 1963, entitled "Apparatus for Weighing, Mixing and Delivering Bulk Fertilizer Material," except that the conveyer paddles in the present application are rectangular rather than triangular.

This conveyer 124 has a receiving funnel 126 which is located directly beneath the open bottom of the hopper 24 without, however, being in contact therewith. The funnel 126 is joined to a horizontal conveyer section 128 which, in turn, connects with the elevating conveyer section 130.

The horizontal conveyer section 128 contains a material dividing and recombining structure consisting of apexed splitter sheets 132 and vertical sidewalls 134. The sidewalls 134 have longitudinal slots 136 at the bottom which may be varied in effective size by means of slidable panels 138 for flow rate control of material therethrough.

Reference numeral 140 designates an I-beam which traverses the length of the conveyer 124 and forms its skeletal structure and guide for the endless chain 144. This I-beam 140 is joined to the sides of the conveyer ducting by support rods 142. The chain 144 carries paddles 146 at spaced intervals which generally conform to the shape of the ducting, in this case rectangular.

The elevating section 130 of the conveyer 124 is supported by a bipod or frame 148. The conveyer chain 144 is driven by a motor 150 and a transmission 152.

In operation, this compounding apparatus 10 is to be charged with various plant or fertilizer constituents A, B, C, D, and E. The operator of the payloader bucket P first introduces material A into the receiving funnel 36. The rotating spokes 118 force lumps of the material to break-up against the breaker bars 120. Compartment 102 directly in the center receives material A as shown. This added weight to the hopper 24 causes the short cranks 50 to pivot and rotate the torque tubes 51. The levers 56 and 58 transmit the movement to the knife edge 60, then through the linkage of rod 62, pivoted lever 64 and rod 72. The scale actuating lever 74 is thereby moved to indicate the added weight on the dial scale 76.

When the operator observes the desired weight of ingredient A has been delivered he scoops up a bucketload of B ingredient and again charges the funnel 36. It will be noted that this material B will fill any remaining space in compartment 102 and then overflows into compartments 104 on either side. After the correct weight of B is added as indicated by additional indication on the scale, constituent C is then introduced. The overflow of C to compartment 106 is apparent. Further ingredient additions are in like manner added, such as D and E.

The action of the overflowing compartments can be likened to the process of cutting a deck of cards achieving the same results, namely reducing the adjacency of like items (i.e. a mixing).

Further mixing occurs when the partly intermingled constituents in the hopper compartments 102, 104, 106, 108 are simultaneously dumped and impinge upon the splitter sheets 132, cascade off and converge again through openings 136. The now thoroughly mixed product is carried away by the paddles 146 and ejected through an exit spout 154 to bags or to a spreader truck T as shown.

Obviously many modifications and variations of the present invention are possible in light of the above teachings. It is, therefore, to be understood that within the scope of the appended claims the invention may be practiced otherwise than as specifically described.

What is claimed is:

1. Apparatus for compounding granular material, comprising structure defining a frame, a weighing hopper suspended from said frame, said hopper having an inlet, a bottom inwardly converging section defining an outlet, and a funnel-shaped structure for directing said granular material through said inlet, a rotatably mounted shaft positioned across said funnel-shaped structure and having a plurality of radially extending spoke members spaced therealong, stationary rod members extending across said funnel-shaped structure transverse to and below said shaft and interleaved with said spoke members for retaining lumps of said granular material to be broken by said spoke members upon rotation of said shaft, a plurality of compartments positioned within said hopper for sequentially receiving granular material supplied to said hopper through said inlet by overflow of said granular material from one of said compartments to an adjacent of said compartments, door means positioned across the bottom of said compartments for obtaining simultaneous discharge from said compartments and into said inwardly converging section of said hopper to obtain mixing of the discharged granular material by gravity flow, and means positioned across said outlet for splitting the flow of the discharge granular material and additionally mixing it by gravity flow.

2. In combination, a weighing hopper having a lower inwardly tapering section terminating in an opening and a plurality of compartments therewithin terminating short of said opening for sequentially receiving granular material supplied to said hopper, means for simultaneously discharging said granular material from said compartments into said inwardly tapering section for mixing by gravity flow, and means positioned across said inwardly tapering section for splitting the flow of said discharging granular material before reaching said opening, and conveyor means positioned in said opening for receiving the discharged and split flow of said granular material.

3. In the combination as recited in claim 2, wherein said conveyor means includes a funnel section overlapping the exterior surface of said inwardly tapering section of said hopper.

4. In the combination as recited in claim 2, wherein said hopper is rectangular in horizontal cross-section and longitudinal divider panels are positioned therewithin for defining said plurality of compartments.

5. In the combination as recited in claim 2, wherein said hopper is provided with an upper funnel-shaped structure for directing said granular material into said plurality of compartments and lump breaking-up means are positioned in said upper funnel-shaped structure, said lump breaking-up means including a rotatable mounted shaft having a plurality of radially extending spoke members spaced therealong and stationary rod members extending across said funnel-shaped structure below said shaft and interleaved with said spoke members.

References Cited by the Examiner

UNITED STATES PATENTS

| | | | |
|---|---|---|---|
| 2,633,133 | 3/1953 | Higgins | 222—238 |
| 3,091,369 | 4/1963 | Sackett | 259—150 |
| 3,155,377 | 11/1964 | Godman | 259—36 |

IRVING BUNEVICH, *Primary Examiner.*

WALTER A. SCHEEL, *Examiner.*

ROBERT W. JENKINS, *Assistant Examiner.*